United States Patent
Schimper et al.

(10) Patent No.: US 8,704,606 B2
(45) Date of Patent: Apr. 22, 2014

(54) MIXER CELL, MODULATOR AND METHOD

(75) Inventors: Markus Schimper, Moosinning (DE); Martin Simon, Otterfing (DE)

(73) Assignee: Intel Mobile Communications GmbH, Neubiberg (DE)

( * ) Notice: Subject to any disclaimer, the term of this patent is extended or adjusted under 35 U.S.C. 154(b) by 33 days.

(21) Appl. No.: 13/464,163

(22) Filed: May 4, 2012

(65) Prior Publication Data

US 2012/0286891 A1    Nov. 15, 2012

(30) Foreign Application Priority Data

May 13, 2011    (DE) .................. 10 2011 075 796

(51) Int. Cl.
*H03C 3/00*    (2006.01)

(52) U.S. Cl.
USPC ........................ 332/105; 341/144; 327/355

(58) Field of Classification Search
USPC .................. 332/105; 341/144, 145; 327/355; 375/295
See application file for complete search history.

(56) References Cited

U.S. PATENT DOCUMENTS

| | | | |
|---|---|---|---|
| 4,408,352 A | 10/1983 | Dudding | |
| 5,270,715 A | 12/1993 | Kano | |
| 5,635,936 A | 6/1997 | Rybicki | |
| 5,886,640 A | 3/1999 | Wang et al. | |
| 6,259,301 B1 | 7/2001 | Gailus et al. | |
| 6,822,595 B1 | 11/2004 | Robinson | |
| 7,035,595 B1 | 4/2006 | Kim et al. | |
| 7,733,980 B2 * | 6/2010 | Beukema et al. | ............. 375/300 |
| 2009/0075601 A1 | 3/2009 | Nezhad-Ahmadi et al. | |
| 2009/0111414 A1 | 4/2009 | Sahota et al. | |
| 2010/0317300 A1 | 12/2010 | Behzad | |
| 2011/0085616 A1 | 4/2011 | Kuttner | |

FOREIGN PATENT DOCUMENTS

| | | |
|---|---|---|
| EP | 0966095 A1 | 12/1999 |
| WO | 2008133489 A1 | 11/2008 |
| WO | 2009036399 A1 | 3/2009 |
| WO | 2010068504 A2 | 6/2010 |

OTHER PUBLICATIONS

Office Action dated Oct. 18, 2012 in connection with U.S. Appl. No. 13/106,992.
U.S. Appl. No. 13/106,963, filed May 13, 2011.
Office Action dated Nov. 15, 2012 for U.S. Appl. No. 13/106,963.
Notice of allowance dated Feb. 5, 2013 for U.S. Appl. No. 13/106,992.

* cited by examiner

*Primary Examiner* — Joseph Chang
(74) *Attorney, Agent, or Firm* — Eschweiler & Associates, LLC

(57) ABSTRACT

Embodiments provide a mixer cell, which is implemented to logically combine a data signal with an oscillator signal and a sign signal to obtain a mixer cell output signal based on the logical combination. Further embodiments provide a modulator with a plurality of mixer cells.

25 Claims, 7 Drawing Sheets

MIXER CELL, MODULATOR AND METHOD

CROSS-REFERENCE TO RELATED APPLICATIONS

This application claims priority to German Patent Application No. 102011075796.1, which was filed on May 13, 2011, and is incorporated herein in its entirety by reference.

FIELD

Embodiments provide a mixer cell that can be used, for example, in a modulator (for example a polar modulator or a vector modulator). Further embodiments provide a modulator having a plurality of such mixer cells.

BACKGROUND

Modern transmitting architectures and mobile radio chips use polar modulators. The phase of the modulated RF signal is modulated via a DPLL (digital phase locked loop) and the amplitude with a high-frequency DAC mixer (DAC -digital to analog converter). A basic problem in a polar modulator is that modulation errors occur at zero crossings in the constellation diagram or the modulation spectrum is softened. During the zero crossing in the constellation diagram, a phase jump of 180° is necessitated, which cannot be processed by the DPLL. Further, the HF-DAC can only provide positive signals.

SUMMARY

Embodiments provide a mixer cell which is implemented to logically combine a data signal with an oscillator signal and a sign signal in order to obtain a mixer cell output signal based on the logical combination.

Further embodiments provide a modulator for providing a modulator output signal with a plurality of above-stated mixer cells. Further, the modulator comprises an oscillator which is implemented to provide an oscillator signal to each mixer cell of the plurality of mixer cells. Further, the modulator comprises a decoder which is implemented to provide a sign signal and a data signal to each mixer cell of the plurality of mixer cells based on information to be transmitted. The plurality of mixer cells are connected to one another such that the modulator output signal is a superposition of the mixer cell output signals of the plurality of mixer cells.

BRIEF DESCRIPTION OF THE DRAWINGS

Embodiments of the present invention will be detailed subsequently referring to the appended drawings, in which:

FIG. 2b is a possible implementation of a current source as it can be used in the embodiment shown in FIG. 2a;

FIG. 3 is a simulation of wave forms of signals of the mixer cell shown in FIG. 2a;

DETAILED DESCRIPTION

Before embodiments will be described in detail based on the accompanying figures, it should be noted that the same elements or elements having the same function are provided with the same reference numbers and hence a repeated description of elements provided with the same reference numbers is omitted. Descriptions of elements provided with the same reference numbers are thus interchangeable.

Figure 1:
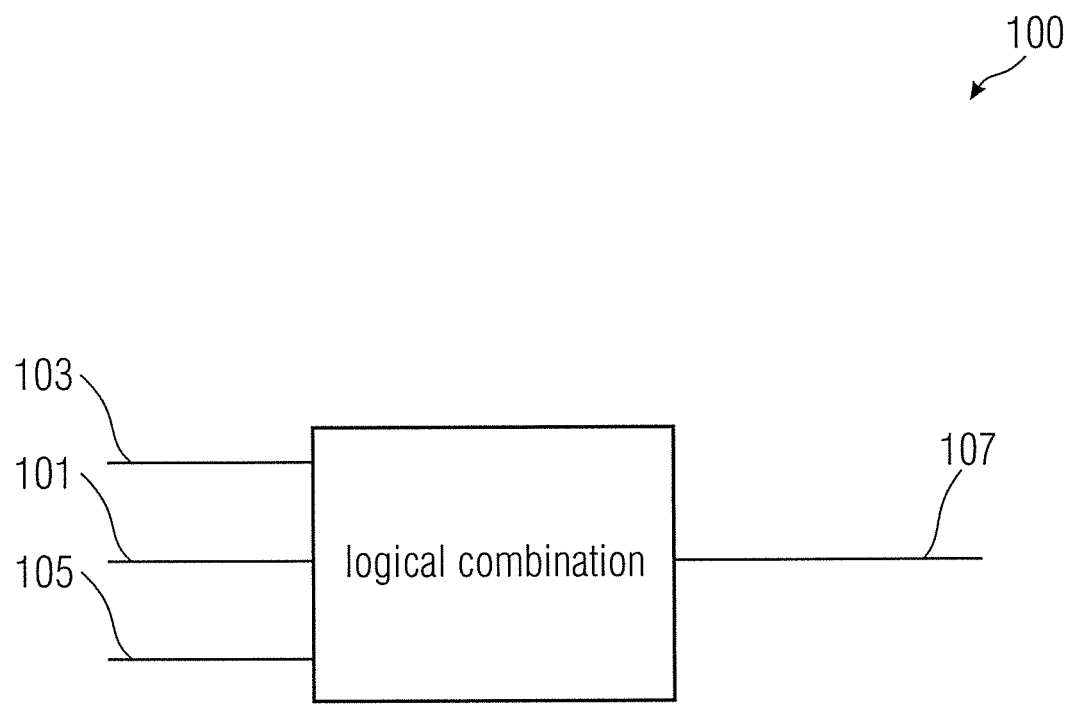
FIG. 1 is a block diagram of a mixer cell according to an embodiment.

FIG. 1 shows a block diagram of a mixer cell 100 according to an embodiment. The mixer cell 100 is implemented to logically combine a data signal 101 with an oscillator signal 103 and a sign signal 105 in order to obtain the mixer cell output signal 107 based on the logical combination.

It is an idea of embodiments that modulation errors at zero crossings in the constellation diagram can be avoided or at least reduced in a modulator (for example in a polar modulator) when, in a mixer cell of such a modulator, a mixer cell output signal is based on a logical combination (such as a digital link) of the data signal and the sign signal. Thus, it is, for example, possible that the polarity of the mixer output signal 107 is reversed by the sign signal 105 with the help of the logical combination or digital link in the mixer cell 100 without necessitating a phase jump of the oscillator signal 103. Thus, by the logical combination of the data signal 101 with the sign signal 105, it is possible that a DPPL providing, for example, the oscillator signal 103, does not have to perform a phase jump of 180° at the oscillator signal 103, even at a zero crossing in the constellation diagram, since the change of sign is already realized by the combination of the data signal 101 with the sign signal 105. By the logical combination of the data signal 101 with the oscillator signal 103 and the sign signal 105 in a mixer cell 100 instead of switching the polarity of the oscillator signal 103, for example, outside the mixer cell 100, non-synchronism between data signal 101 and sign signal 105 can be avoided.

For example, in a modulator, when applying a plurality of mixer cells 100 in this modulator, each mixer cell can obtain the same sign signal 105 as well as the same oscillator signal 103, and can logically combine this oscillator signal 103 and the sign signal 105 with its dedicated data signal 101 to obtain its mixer cell output signal.

According to several embodiments, the data signal 101, the oscillator signal 103 and the sign signal 105 can be digital signals. These digital signals can be represented, for example, by one bit each. By using digital signals and logically combining these digital signals, high synchronism of the oscillator signal 103, the data signal 101 and the sign signal 105 is obtained, such that the modulator output signal 107 has high accuracy. Further, digital signals can be easily realized and a zero crossing in the modulation diagram can be realized by simply switching the sign signal 105, for example from a "0" level to a "1" level. Thus, the oscillator signal 103 can be independent of the sign of a digital data word (of which the data signal 103 represents one bit).

In a modulator, the oscillator signal 103 can be a phase modulated digital signal, wherein zero crossings in the constellation diagram of an output signal of the modulator to be generated are realized not by 180° phase jumps of the oscillator signal 103, but by switching the sign signal 105 for the individual mixer cells of the modulator.

According to several embodiments, the data signal 101, the oscillator signal 103 and the sign signal 105 can be voltages and the mixer cell 100 can be implemented to receive these signals as voltages.

According to further embodiments, the output signal 107 provided by the mixer cell 100 can be a current. In other words, the mixer cell 100 can be implemented to provide the mixer cell output signal 107 as current, for example digital current, which can assume two different values (comparable to a "0" level and a "1" level, for example "current on", "current off") depending on the file signal 101, the oscillator signal 103 and the sign signal 105.

Figure 2A:
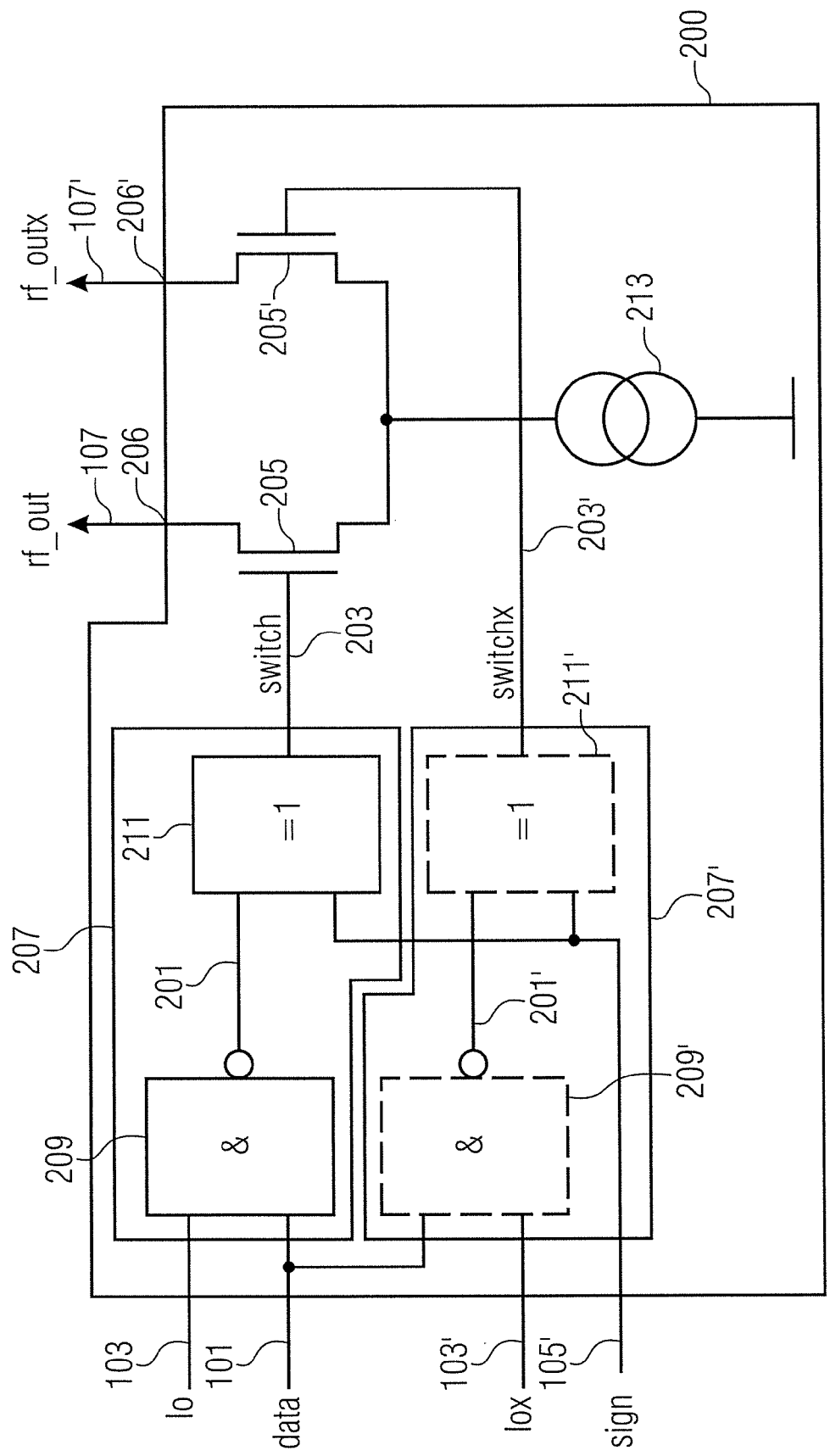
FIG. 2a is a block diagram of a possible implementation of the mixer cell of FIG. 1 according to an embodiment.

FIG. 2*a* shows in a block diagram a mixer cell 200 as one possible implementation of the mixer cell 100 shown in FIG. 1 according to a further embodiment. The mixer cell 200 is implemented to logically combine a data signal 101 with a first oscillator signal 103 and a sign signal 105 to obtain a first mixer cell output signal 107 (also referred to as rf_out). The mixer cell 200 differs from the mixer cell 100 in that it is further implemented to combine the data signal 101 with a second oscillator signal 103' and the sign signal 105 to obtain a second mixer output signal 107' (also referred to as rf_outx). This second logical combination of the data signal 101 with the second oscillator signal 103' and the sign signal 105 presents merely an optional possibility of obtaining a second mixer cell output signal 107', for example for a differential realization. Thus, embodiments may provide only one mixer cell output signal 107 based on a logical combination of the data signal 101 with an oscillator signal 103 and the sign signal 105. Thus, in the following, at first, the logical combination of the data signal 101 with the first oscillator signal 103 and the sign signal 105 to obtain the first mixer cell output signal 107 will be described in detail.

The data signal 101, the oscillator signal 103 and the sign signal 105 form input signals of the mixer cell 200, and the mixer cell output signal 107 forms an output signal of the mixer cell 200. The mixer cell 200 is implemented to combine two of its input signals (the data signal 101 and the oscillator signal 103) by means of a first logical combination, and to logically combine a result 201 of the first logical combination with the third input signal (the sign signal 105) by means of a second logical combination to obtain the mixer cell output signal 107 based on a result 203 of the second logical combination. In the embodiment shown in FIG. 2*a*, the first logical combination is an NAND operation and the second logical combination an XOR operation. Thus, the mixer cell 200 is implemented to subject the oscillator signal 103 with the data signal 101 to an NAND operation and to XOR the result 201 of this NAND operation with the sign signal 105, in order to obtain the mixer cell output signal 107 based on the result 203 of this XOR operation.

As shown in FIG. 2*a*, the mixer cell 200 can comprise a first current switch 205, wherein the mixer cell output signal 107 is a current along this first current switch 205. The result 203 forms a first control signal 203 for the first current switch 205. For example, the first current switch 205 can be opened or closed depending on the value of the control signal 203, such that no current flows along the current switch 205 in an opened state of the current switch 205 (for example at a "0" level of the first control signal 203), and current flows along the current switch 205 in a closed state of the current switch 205 (for example at a "1" level of the first control signal 203). Thus, the mixer cell output signal 107 will have a "0" level in the opened state of the current switch 105, and a "1" level in the closed state of the current switch 205.

In summary, the mixer cell 200 shows a first logic circuit 207 implemented to provide, based on a logical combination of the data signal 101 with the first oscillator signal 103 and the sign signal 105, the first control signal 203 for the first current switch 205.

The first logic circuit 200 comprises a first NAND gate 209. A first input of the first NAND gate 209 is coupled to a first input of the mixer cell 200 to which the first oscillator signal 103 can be applied. A second input of the first NAND gate 209 is coupled to a second input of the mixer cell 200, to which the data signal 101 can be applied. Further, the first logic circuit 200 comprises an XOR gate 211. A first input of the XOR gate 211 is coupled to an output of the first NAND gate 209 to receive the result 201 of the NAND operation of the first oscillator signal 103 and the data signal 101. A second input of the XOR gate 211 is coupled to a third input of the mixer cell 200 to which the sign signal 105 can be applied. An output of the first XOR gate 211 is coupled to a control terminal of the first current switch 205 (for example directly connected) to provide the first control signal 203 to the current switch 205.

In the present application, a coupling means a direct low-resistance coupling and an indirect coupling with one or several interposed members, such that a signal at a second circuit node depends on a signal at a first circuit node coupled to the second circuit node. In other words, further devices, in particular passive devices, such as resistors or switching paths of active devices, such as switches or transistors, can be connected between the two terminals coupled to each other. In coupled terminals, a member can be connected between these terminals, but does not have to, such that two terminals coupled to each other can also be connected directly to each other (i.e. by a low-resistance conductive connection).

Further, according to the present application, a first terminal is directly connected to a second terminal when a signal applied to the second terminal is identical to a signal applied to the first terminal, wherein parasitic effects or slight losses due to conductor resistances are to be neglected. Thus, two directly connected terminals are typically connected via traces or wires without additional interposed members.

According to several embodiments, the first logic circuit 207 can provide the first control signal 203 as a digital signal, for example such that in a first state of the control signal the first current switch 205 is non-conductive and such that in a second state of the first control signal 203, which differs from the first state of the first control signal 203 (for example complementary to the same), the first current switch 205 is conductive.

According to further embodiments, the mixer cell 200 can comprise a current source 213 (for example a constant current source 213). The current source can generate, for example, a positive current (out of the current source) or a negative current (into the current source).

Here, a switching path of the first current switch 205 can be connected between the current source 213 and a first output 206 of the mixer cell 200 where the first mixer cell output signal 107 of the mixer cell 200 is provided. Thus, the first current switch 205 can be implemented to provide, in its conductive state, a current provided by the current source 213 as the first mixer cell output signal 107 at the first output 206 of the mixer cell 200.

As shown in FIG. 2*a*, the current switch 205 can be realized as a transistor, wherein a control terminal of the transistor is coupled to the output of the first logic switch 207 (for example with the output of the first XOR gate 211). The switching path of this first current switch 205 can be coupled between the current source 213 and the first output 206 of the mixer cell 200. For example, a source terminal of the first current switch 205 can be coupled to the current source 213, and a drain terminal of the first current switch 205 can be coupled to the first output 206 of the mixer cell 200.

The first current switch 205 can, for example, be a field effect transistor, a metal oxide semiconductor field-effect transistor (MOSFET) or a bipolar transistor.

A source terminal of the transistor can, for example, be a source terminal or an emitter terminal of the transistor, a drain terminal can, for example be a drain terminal or a connector terminal of the transistor and a control terminal can, for example, be a gate terminal or a base terminal of the transistor. The switching path of such a transistor can thus, for example, be a drain-source path of the transistor or an collector-emitter path of the transistor. Then, a main transistor current flows typically from the source terminal to the drain terminal or vice versa.

According to further embodiments, the current switch 205 can also be realized with other switch types, for example in the form of so-called transmission gates, relays or MEMS switches (MEMS=microelectromechanical system).

In some cases of application, it is useful to obtain a differential output signal. In this case, as shown in FIG. 2a, the mixer cell 200 can comprise a second logic circuit 207' and a second current switch 205'. The second logic circuit 207' in connection with the second current switch 205' are implemented to logically combine the data signal 101 with the second oscillator signal 103' and the sign signal 105 to provide the second mixer cell output signal 107'. The second logic circuit 207' can be structured analogously to the first logic circuit 207, with the difference that the same receives the second oscillator signal 103' instead of the first oscillator signal 103. The two oscillator signals 103, 103' can be provided complementary to each other, for example phase-shifted by 180°.

Thus, the second logic circuit 207' comprises a second NAND gate 209' and a first input of the second NAND gate 209' is coupled to the second input of the mixer cell 200 where the data signal 101 is provided. A second input of the second NAND gate 209' is coupled to a fourth input of the mixer cell 200 where the second oscillator signal 103' is provided. Further, the second logic circuit 207' comprises a second XOR gate 211'. A first input of the second XOR gate 211' is coupled to an output of the first NAND gate 209' in order to receive a result 201' of the NAND operation of the data signal 101 with the second oscillator signal 103'. The second input of the second XOR gate 211' is coupled to the third input of the mixer cell 200 where the sign signal 105 is provided. An output of the second XOR gate 211' and hence an output of the second logic circuit 207' is coupled to a control terminal of the second current switch 205' in order to provide to the second current switch 205' a second control signal 203' as a result of the XOR operation of the sign signal 105 with the result 201' of the NAND operation of the data signal 101 with the second oscillator signal 103'.

A switching path of the second current switch 205' is connected between the current source 213 and a second output 206' of the mixer cell 200 where the second mixer cell output signal 107' is provided. The second mixer cell output signal 207' can also be provided as current by the mixer cell 200. The current switches 205, 205' are both coupled to the current source 213, such that (with an equally selected downstream stage for the two current switches 205, 205') a minimum and a maximum amplitude of the mixer cell output signals 107, 107' can each be identical.

Analogously to the first current switch 205, the second current switch 205' can also be realized as a transistor.

According to further embodiments, the two current switches 205, 205' can be realized identically.

Thus, the mixer cell 200 is implemented to perform the logical combination of the data signal 101, the sign signal 105 and the second oscillator signal 103' simultaneously with the logical combination of the data signal 101 with the first oscillator signal 102 and the sign signal 105.

Figure 2B:
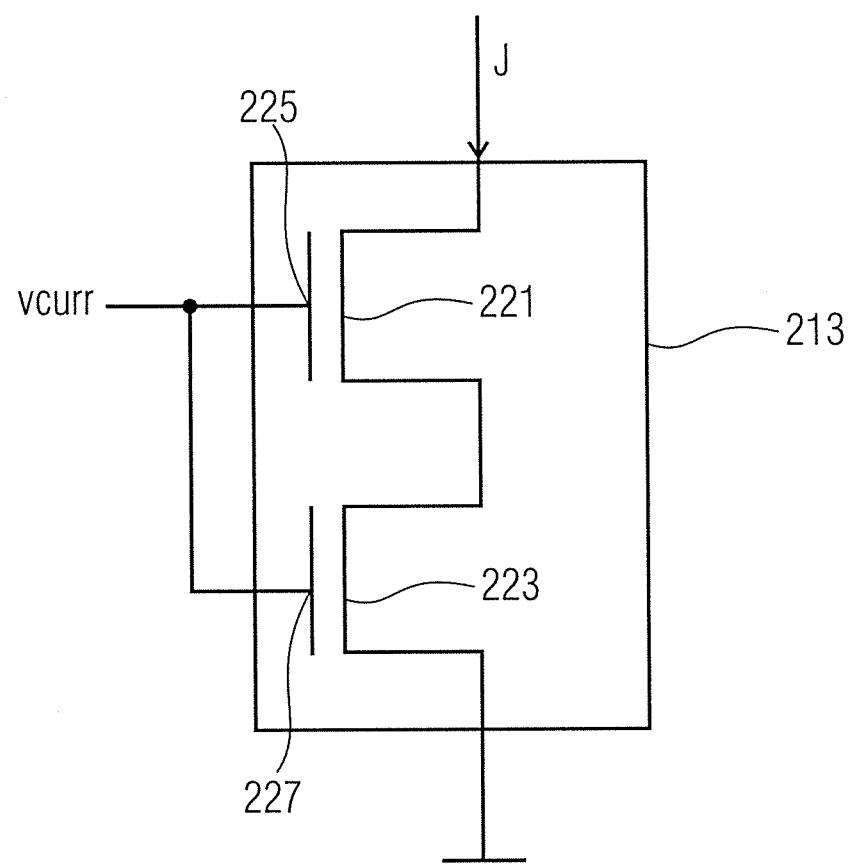

FIG. 2b shows a possible implementation of the current source 213 with two consecutively connected transistors 221, 223, control terminals 225, 227 of the two transistors 221, 223 are connected to a common control terminal of the current source 213 where, for example, a control voltage vcurr can be applied. Via the control voltage vcurr, a current J provided by the current source 213 can be set. This current J can be provided by the current switches 205, 205' to the mixer cell 200 as mixer output signals 107, 107'.

Figure 3:
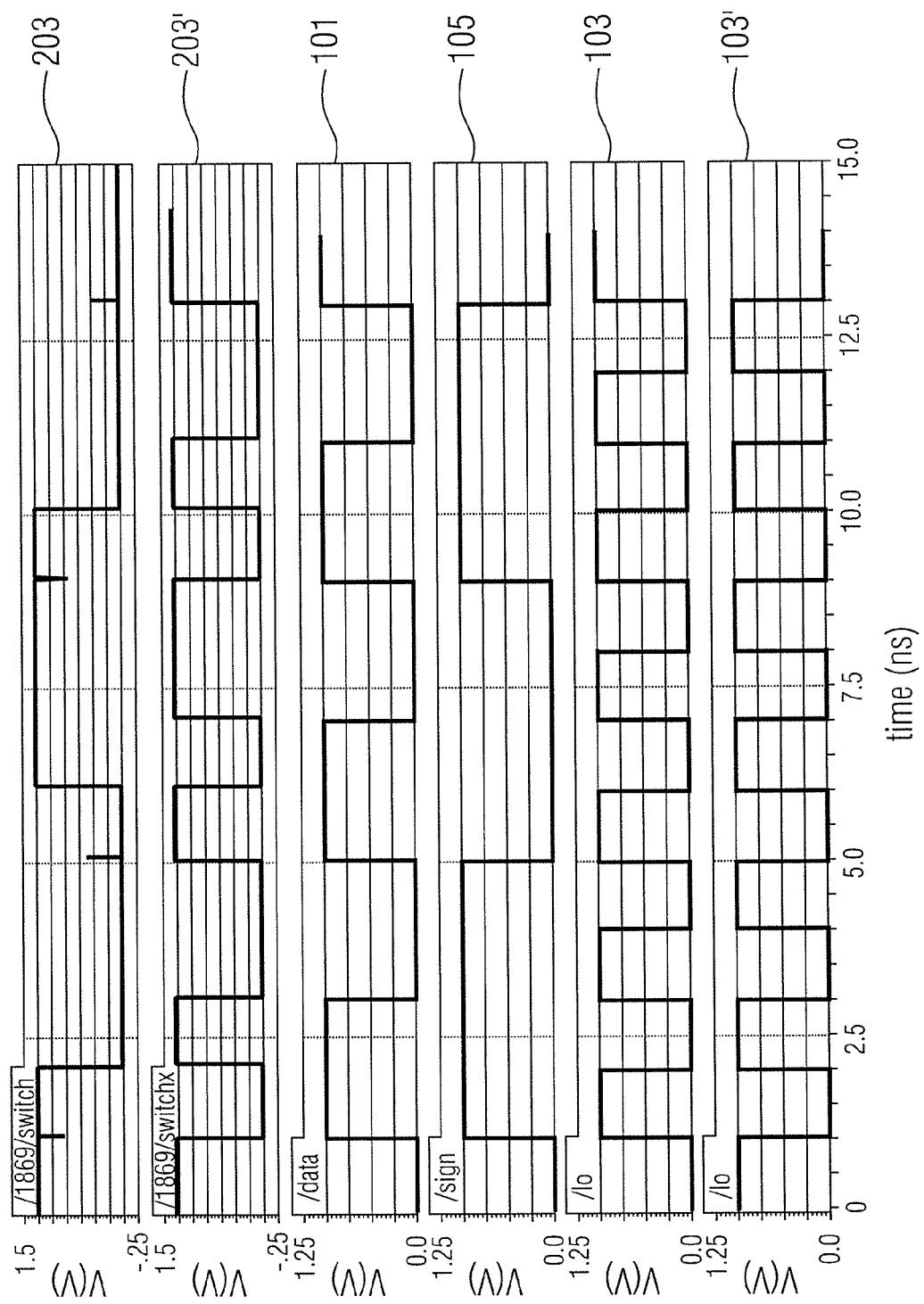

FIG. 3 shows a simulation of wave forms as they can occur in the mixer cell 200 shown in FIG. 2a based on the applied data signal 101, the two oscillator signals 103, 103' and the sign signal 105. Here, the two top diagrams show the two control signals 203, 203' for the two current switches 205, 205' as a result of the logical combinations of the signals 101, 103, 103', 105 illustrated in the bottom four diagrams. On the X axis, the time is plotted in nanoseconds, while on the Y axis the voltage is plotted in volt.

It becomes obvious that by reversing the sign for the data signal 101, the control signals 203, 203' are also reversed. Thus, for example, the first control signal 203 comprises an "1" level, when the data signal 101, the first oscillator signal 103 as well as the sign signal 105 comprise an "1" level. On the other hand, the control signal 203 comprises a "0" level, when the data signal 101 and the oscillator signal 103 comprise a "1" level and the sign signal 105 comprises a "0" level.

The two control signals 203, 203' correlate directly with the mixer cell output signals 107, 107', thus, for example, the first mixer cell output signal 107 can comprise a "1" level (i.e. current flows along the switching path of the first current switch 205), when the first control signal 203 comprises a "1" level, on the other hand, the first mixer cell output signal 107 can comprise a "0" level (i.e. no current flows along the first current switch 205) when the first control signal 203 comprises a "0" level. Analogously, this applies also to the second mixer cell output signal 207' and the second control signal 203'.

Figure 4:
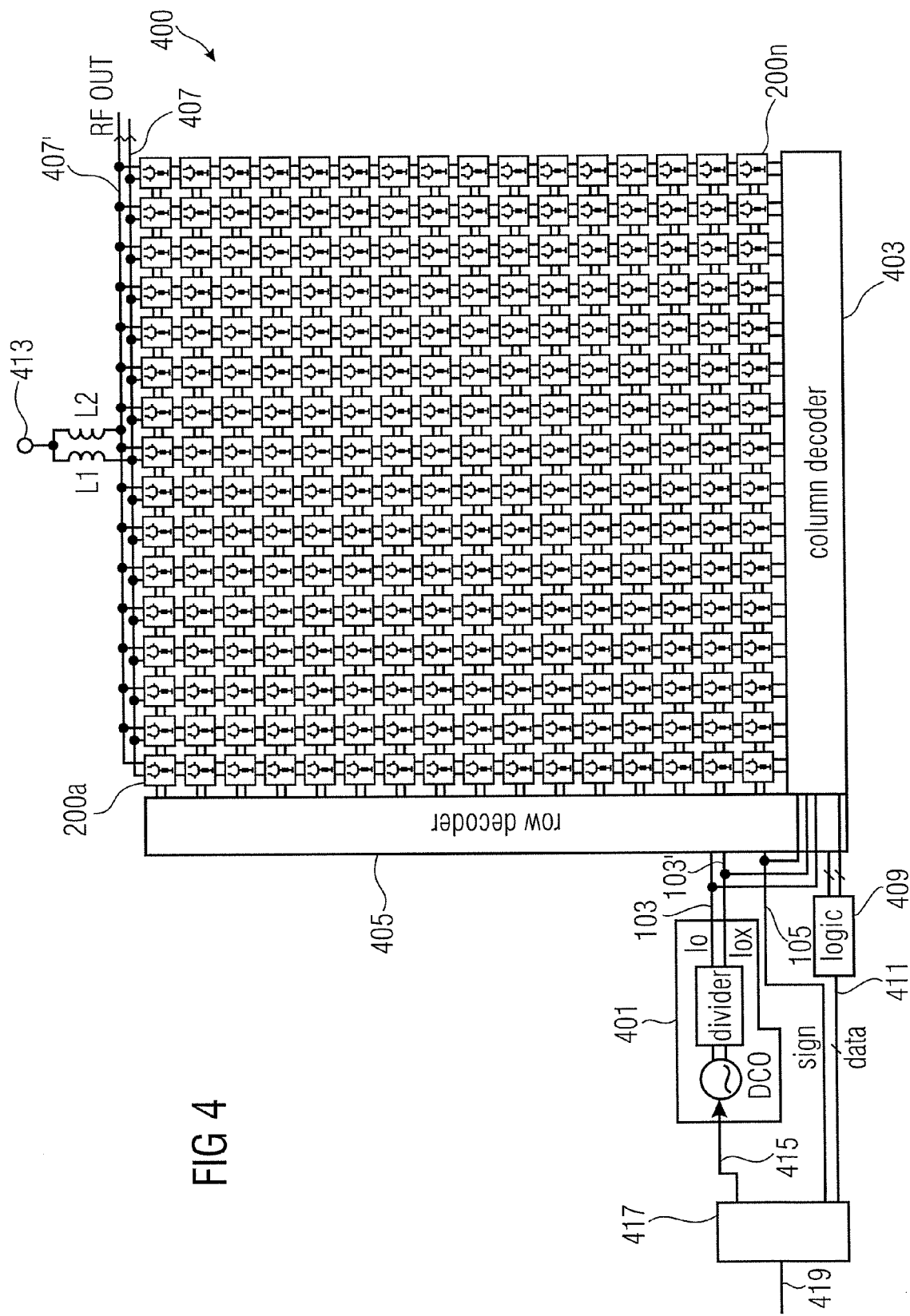
FIG. 4 is a block diagram of a modulator according to an embodiment.

FIG. 4 shows a schematic illustration of a modulator 400 according to an embodiment of the present invention. The modulator 400 comprises a plurality of mixer cells 200a-200n (wherein n is any natural number). Further, the modulator 400 comprises an oscillator 401, which is implemented to provide a first oscillator signal 103 and a second oscillator signal 103' to each mixer cell of the plurality of mixer cells 200a-200n. The first oscillator signal 103 and the second oscillator signal 103' can, for example, be inverted with respect to each other. Further, the modulator 400 comprises a control unit 417, which is implemented to provide a sign signal 105 and a data signal (for example the data signal 101) to each mixer cell of the plurality of mixer cells based on information 419 to be transmitted. The plurality of mixer cells 200a-200n are connected to each other such that a first modulator output signal 407 is a superposition of the first mixer cell output signals (for example, the mixer cell output signals 107) of the plurality of mixer cells 200a-200n. A second modulator output signal 407' is a superposition of the second mixer cell output signals of the plurality of mixer cells 200a-200n. The mixer cells used in the modulator 400 can, for example, each be structured identically to the mixer cell 200 shown in FIG. 2a, i.e., each of the mixer cells receives a data signal dedicated to the same from the decoder, as well as the first oscillator signal 103, the second oscillator signal 103' and the sign signal 105 to provide its mixer cell output signals 107, 107' based on logical combinations of these received signals.

According to further embodiments, for example in a non-differential arrangement, further, mixer cells can be used that receive merely one oscillator signal and also provide only one mixer cell output signal, such that the modulator 400 also provides only one modulator output signal 407. In this case, the oscillator 401 can also provide only one oscillator signal 103 to the plurality of mixer cells.

In the modulator 400 shown in FIG. 4, the decoder comprises a column decoder 403 and a row decoder 405 to provide, to each mixer cell 200a-200n, the first oscillator signal 103, the second oscillator signal 103', the sign signal 105 and a data signal allocated (dedicated) to the same. Further, the decoder of the modulator 400 can comprise a logic circuit 409, which provides control signals for the row decoder 405 and the column decoder 403 based on a data word 411 to be transmitted from the control unit 417.

First outputs of the mixer cells 200a-200n can be connected to a common output node of the modulator 400, where the first modulator output signal 407 is provided. Second mixer cell outputs of the mixer cells 200a-200n can be connected to a second modulator output node of the modulator 400 where the second modulator output signal 407' is provided. The first modulator output node can be coupled to a current source 413 of the modulator 400 via a first coil L1, and the second modulator output node can be coupled to the current source 413 via a second coil L2.

The modulator 400 shown in FIG. 4 can, for example, be a polar modulator, i.e. the oscillator 401 is implemented to vary a phase of the oscillator signal 103 (and the second oscillator signal 103') based on the information to be transmitted. For example, the oscillator 401 can be implemented to receive a phase setting signal 415 from the control unit 417.

According to further embodiments, the control unit 417 of the modulator 400 can comprise a QAM decoder 417, which is implemented to provide the phased setting signal 415, the sign signal 105 and the data word 411 based on the information 419 to be transmitted.

In the differential arrangement shown in FIG. 4, the modulator 400 is implemented to provide a differential output signal (in the form of a difference between the first modulator output signal 407 and the second modulator output signal 407'). This differential output signal can for example, be given on an antenna circuit for transmitting the same via radio. This differential output signal can, for example, be a QAM modulated (quadrature amplitude modulated) signal. Contrary to the data signals for the individual mixer cells 200a-200n, the data word 411 can comprise a plurality of states and describe an amplitude of the desired differential output signal. This amplitude can be provided at the modulator output node with the mixer cells 200a-200n by adding up the mixer cell output signals 107, 107'.

Figure 5:
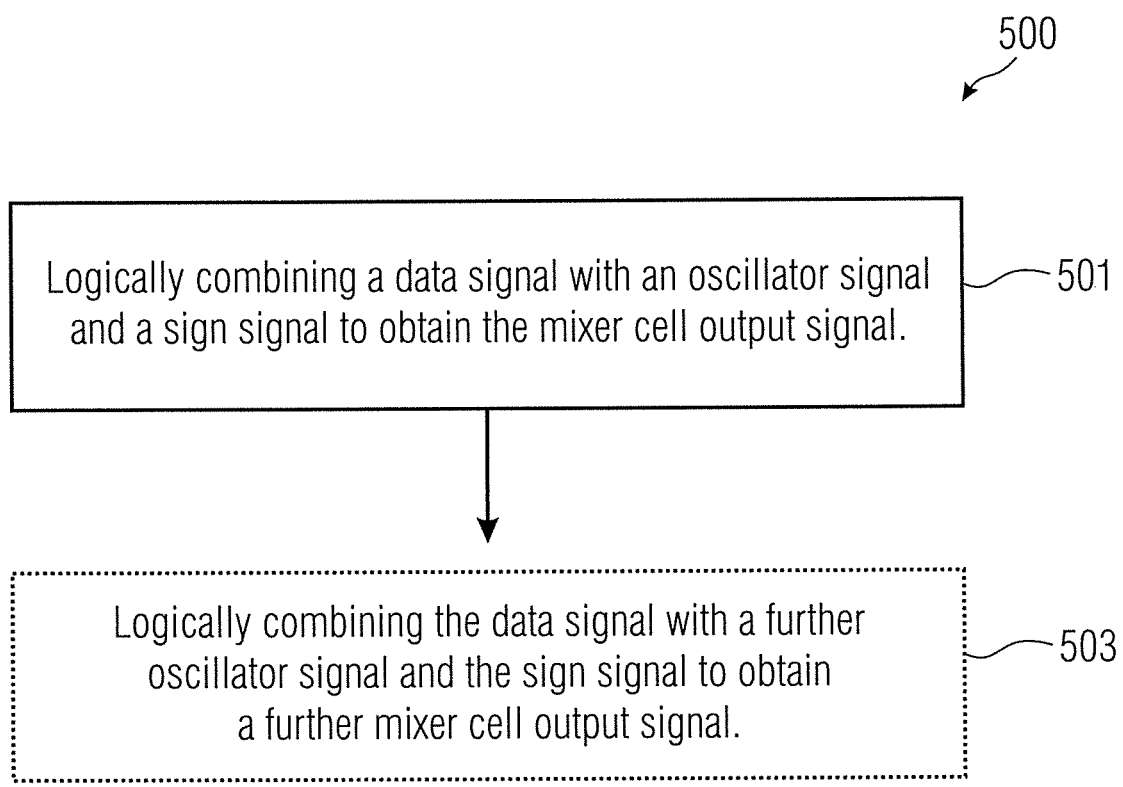
FIG. 5 is a flow diagram of a method according to an embodiment.

FIG. 5 shows a flow diagram of a method 500 according to a further embodiment.

The method 500 comprises a step 501 of logically combining a data signal with an oscillator signal and a sign signal to obtain a mixer cell output signal. The method 500 can be performed, for example, by the mixer cell 100 or the mixer cell 200 or a further mixer cell according to an embodiment.

Optionally, the method 500 can further comprise a step 503. This optional step 503 can comprise logically combining the data signal with a further oscillator signal and the sign signal to obtain a further mixer cell output signal.

According to a further embodiment, steps 501 and 503 can be performed simultaneously.

In the following, some aspects of embodiments will be summarized.

Embodiments provide a distributed digital RF DAC mixer cell with a sign signal and a sign bit. Further embodiments provide a distributed RF DAC mixer (for example the modulator 400).

Figure 6:
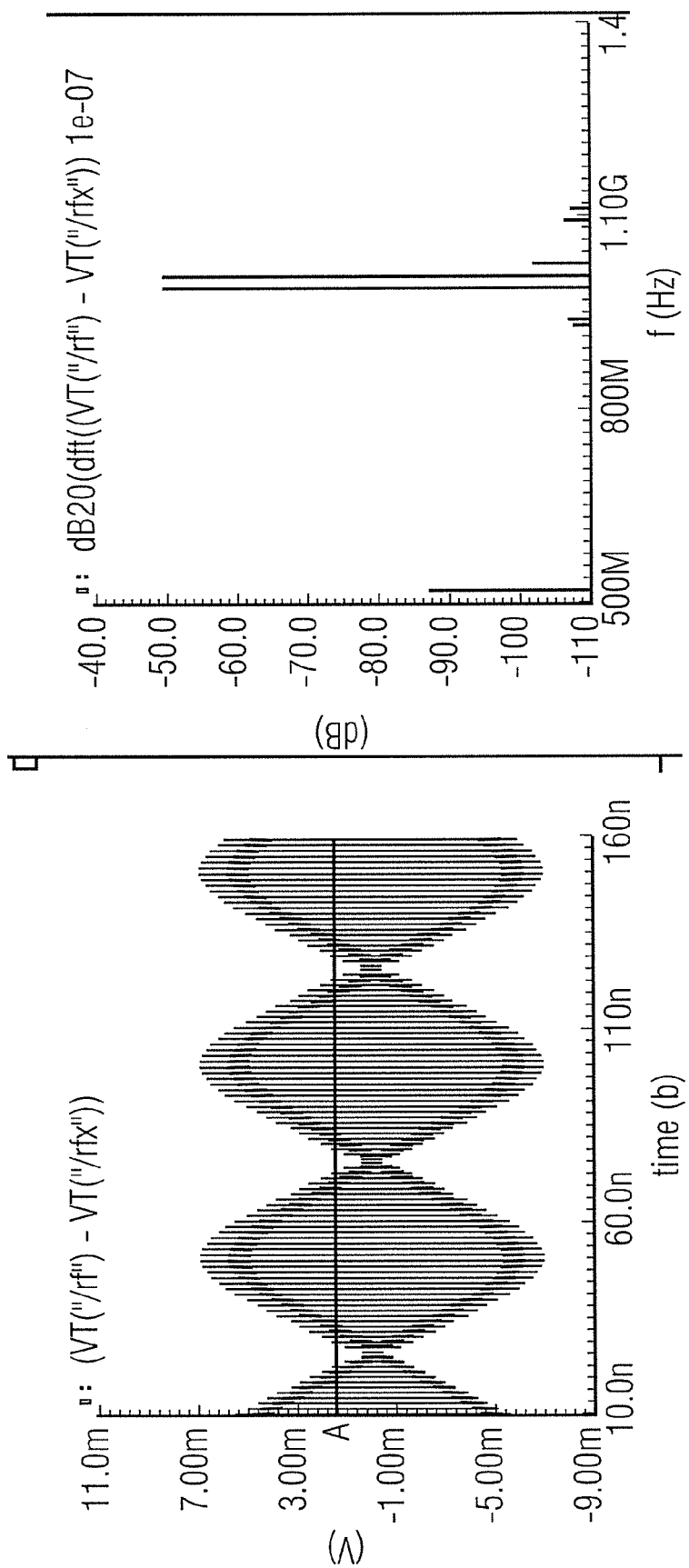
FIG. 6 is the time output signal and the output spectrum of an RF-DAC according to an embodiment.

FIG. 6 shows the time output signal and the output spectrum of such a RF DACs as simulation result with a resolution of 256 bits and a 1 GHz LO frequency (oscillator frequency of the oscillator signal).

Further embodiments provide an RF DAC or a modulator (for example a digital vector modulator, like the modulator 400) with a digital distributed double balanced mixer, wherein the digital distributed double balanced mixer of the RF DAC or modulator comprises a plurality of mixer cells (for example mixer cells 200a-200n) according to embodiments. This digital distributed double balanced mixer has the advantage that no bias current is necessitated or exists in the signal path, and hence no corruption of the signal (for example due to a varying bias current) can occur. In summary, several embodiments provide a digital vector modulator with a distributed digital double-balanced mixer, which allows that no bias current is necessitated in the signal path of the digital vector modulator.

By inserting a sign bit and an XOR operation into the mixer cells of the distributed RF DAC, it is possible to process positive and negative half-waves of the data word. Thus, the problem of the zero crossing in the constellation diagram is solved. The XOR operation is made directly with the LO signal (the oscillator signal) or after the NAND operation for mixing the two signals. With a reduced output power at the mixer output, noise is also reduced, since the current sources are turned off.

In embodiments, the polarity of the output signal is reversed with the sign bit of the digital data word with the help of a digital link in a cell of the distributed RF DAC.

Embodiments can be realized with standard cells, for example, XOR gates and NAND gates can be realized with the help of standard cells.

While some aspects have been described in the context of a device, it is obvious that these aspects also represent the description of the respective method, such that a block or device of an apparatus can also be seen as a respective method step or feature of a method step. Analogously, aspects described in the context of or as a method step also represent a description of a respective block or a detail or feature of a respective apparatus. Some or all of the method steps can be executed by a hardware apparatus (or by using a hardware apparatus), such as a microprocessor, a programmable computer or an electronic circuit. In some embodiments, some or several of the most important method steps can be performed by such an apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A mixer cell implemented to logically combine a data signal with an oscillator signal and a sign signal to acquire a mixer cell output signal based on the logical combination, wherein the data signal, the oscillator signal and the sign signal are input signals of the mixer cell;

wherein the mixer cell is implemented to logically combine two of its input signals by means of a first logical combination, and to logically combine a result of the first logical combination with the third input signal by means of a second logical combination, to acquire the mixer cell output signal based on a result of the second logical combination; and wherein the second logical combination is configured to avoid phase jumps of the oscillator signal.

2. The mixer cell according to claim 1, wherein the first logical combination is an NAND operation and the second logical combination is an XOR operation, or wherein the first logical combination is an XOR operation and the second logical combination an NAND operation.

3. The mixer cell according to claim 1, which is implemented to logically combine the oscillator signal with the data signal by means of a first logical combination, and to logically combine a result of the first logical combination with the sign signal by means of a second logical combination, to acquire the mixer cell output signal based on a result of the second logical combination.

4. The mixer cell according to claim 1, which is further implemented to logically combine the data signal and the sign signal with a further oscillator signal to acquire a further mixer cell output signal.

5. The mixer cell according to claim 4, which is implemented to perform the logical combination of the data signal, the sign signal and the oscillator signal independent of the logical combination of the data signal, the sign signal and the further oscillator signal.

6. The mixer cell according to claim 4, which is implemented to perform the logical combination of the data signal, the sign signal and the further oscillator signal analogously to the logical combination of the data signal, the sign signal and the oscillator signal.

7. The mixer cell according to claim 4, which is implemented to perform the logical combination of the data signal, the sign signal and the oscillator signal simultaneously with the logical combination of the data signal, the sign signal and the further oscillator signal.

8. The mixer cell according to claim 1, which is implemented to receive the data signal, the sign signal and the oscillator signal as digital signals.

9. The mixer cell according to claim 1, which is implemented to receive the data signal, the sign signal and the oscillator signal as voltage signal.

10. The mixer cell according to claim 1, which is implemented to provide the mixer cell output signal as current signal.

11. A mixer cell implemented to logically combine a data signal with an oscillator signal and a sign signal to acquire a mixer cell output signal based on the logical combination;

wherein the data signal, the oscillator signal and the sign signal are input signals of the mixer cell;

wherein the mixer cell is implemented to logically combine two of its input signals by means of a first logical combination, and to logically combine a result of the first logical combination with the third input signal by means of a second logical combination, to acquire the mixer cell output signal based on a result of the second logical combination; and wherein the first logical combination is an NAND operation and the second logical combination is an XOR operation.

12. A mixer cell implemented to logically combine a data signal with an oscillator signal and a sign signal to acquire a mixer cell output signal based on the logical combination; comprising a logic circuit and a current switch;

wherein the logic circuit is implemented to provide a control signal for the current switch based on the logical combination of the data signal, the sign signal and the oscillator signal; and wherein the mixer cell output signal is a current along the current switch.

13. The mixer cell according to claim 12, wherein the logic switch is implemented to provide the control signal as digital signal.

14. The mixer cell according to claim 12, wherein the logic circuit is implemented to provide the control signal such that the current switch is non-conductive in a first state of the control signal, and such that the current switch is conductive in a second state of the control signal which differs from the first state of the control signal.

15. The mixer cell according to claim 12, wherein a switching path of the current switch is connected between a current source and an output of the mixer cell where the mixer cell output signal is provided; and wherein a control terminal of the current switch is coupled to an output of the logic circuit where the control signal is provided.

16. The mixer cell according to claim 12, further comprising a further current switch and a further logic circuit;

wherein the further logic circuit is implemented to perform a logical combination of the data signal, the sign signal and a further oscillator signal to acquire a further control signal for the further current switch; and wherein the mixer cell is implemented to provide a further mixer cell output signal which is a current along the further current switch.

17. The mixer cell according to claim 12, wherein current switches of the mixer cell are transistors.

18. A method for providing a mixer cell output signal, comprising:

logically combining a data signal with an oscillator signal to provide a first result; and logically combining the first result with a sign signal to acquire the mixer cell output signal and avoid phase jumps of the oscillator signal.

19. A circuit, comprising:

a mixer cell implemented to logically combine a data signal with an oscillator signal and a sign signal to acquire a mixer cell output signal based on the logical combination; and an oscillator which is implemented to provide the oscillator signal and a further oscillator signal such that the further oscillator signal is inverted to the oscillator signal;

wherein the logical combination of the mixer cell is configured to avoid phase jumps of the oscillator signal.

20. A mixer cell, comprising:

a data signal input for receiving a data signal;

a first oscillator signal input for receiving a first oscillator signal;

a second oscillator signal input for receiving a second oscillator signal;

a sign signal input for receiving a sign signal;

a first mixer cell output for providing a first mixer cell output signal;

a second mixer cell output for providing a second mixer cell output signal;

a first NAND gate and a second NAND gate;

a first XOR gate and a second XOR gate; and a first current switch and a second current switch;

wherein a first input of the first NAND gate is coupled to the first oscillator signal input and a second input of the first NAND gate is coupled to the data signal input;

wherein a first input of the second NAND gate is coupled to the data signal input and a second input of the second NAND gate is coupled to the further oscillator signal input;

wherein a first input of the first XOR gate is coupled to an output of the first NAND gate and a second input of the first XOR gate is coupled to the sign signal input;

wherein a first input of the second XOR gate is coupled to an output of the second NAND gate and a second input of the second XOR gate is coupled to the sign signal input;

wherein an output of the first XOR gate is coupled to a control terminal of the first current switch;

wherein an output of the second XOR gate is coupled to a control terminal of the second current switch;

wherein the first mixer cell output is coupled to a switching path of the first current switch; and wherein the second mixer cell output is coupled to a switching path of the second current switch.

21. A modulator for providing a modulator output signal, comprising:

a plurality of mixer cells implemented to logically combine a data signal with an oscillator signal and a sign signal to acquire a mixer cell output signal based on the logical combination, an oscillator, which is implemented to provide an oscillator signal to each mixer cell of the plurality of mixer cells; and a decoder, which is implemented to provide, based on information to be transmitted, a sign signal and a data signal to each mixing cell of a plurality of mixer cells; and wherein the plurality of mixer cells are connected to each other such that the modulator output signal is a superposition of the mixer cell output signals of the plurality of mixer cells.

22. The modulator according to claim 21, wherein the oscillator is implemented to vary a phase of the oscillator signal in dependence on the information to be transmitted.

23. The modulator according to claim 21, wherein the oscillator is implemented to provide the same oscillator signal to each mixer cell of the plurality of mixer cells.

24. The modulator according to claim 21, wherein the decoder is implemented to provide the same sign signal to each mixer cell of the plurality of mixer cells and to provide a data signal allocated to the mixer cell to each mixer cell.

25. The modulator according to claim 21, which is further implemented to provide a further modulator output signal;

wherein the oscillator is implemented to provide a further oscillator signal to each mixer cell of the plurality of mixer cells;

wherein each mixer cell of the plurality of mixer cells is implemented to logically combine its data signal with the further oscillator signal and the sign signal to acquire a further mixer cell output signal based on this further logical combination; and wherein the plurality of mixer cells are connected to each other such that the further modulator output signal is a superposition of the further mixer cell output signals of the plurality of mixer cells.

* * * * *